United States Patent
Dossey et al.

(10) Patent No.: US 6,895,521 B2
(45) Date of Patent: May 17, 2005

(54) COMMUNICATION SYSTEM POWER LOSS NOTIFICATION VIA DETECTION OF REVERSE BIAS STATE OF A DIODE BASED ON A THRESHOLD VOLTAGE

(75) Inventors: John W. Dossey, Fort Worth, TX (US); Sanh T. Do, Plano, TX (US)

(73) Assignee: Efficient Networks, Inc., Dallas, TX (US)

(*) Notice: Subject to any disclaimer, the term of this patent is extended or adjusted under 35 U.S.C. 154(b) by 470 days.

(21) Appl. No.: 09/753,798

(22) Filed: Jan. 2, 2001

(65) Prior Publication Data

US 2002/0087908 A1 Jul. 4, 2002

(51) Int. Cl.[7] .................................................. G06F 1/28
(52) U.S. Cl. ...................................... 713/340; 713/300
(58) Field of Search ................................. 713/340, 300

(56) References Cited

U.S. PATENT DOCUMENTS

| | | | | |
|---|---|---|---|---|
| 3,877,001 A | * | 4/1975 | Bogut et al. ................ | 340/527 |
| 4,227,141 A | * | 10/1980 | Cross ......................... | 320/161 |
| 4,260,362 A | * | 4/1981 | Matthews .................... | 431/69 |
| 4,385,384 A | * | 5/1983 | Rosbury et al. ............. | 714/717 |
| 4,467,748 A | * | 8/1984 | Watanabe ............... | 123/179.16 |
| 5,726,505 A | * | 3/1998 | Yamada et al. ............. | 307/127 |
| 6,259,285 B1 | * | 7/2001 | Woods ........................ | 327/143 |
| 6,281,723 B1 | * | 8/2001 | Tailliet ....................... | 327/143 |
| 6,476,651 B1 | * | 11/2002 | Watanabe .................... | 327/143 |
| 6,629,248 B1 | * | 9/2003 | Stachura et al. ............ | 713/340 |

* cited by examiner

*Primary Examiner*—Rehana Perveen
*Assistant Examiner*—Tse Chen
(74) *Attorney, Agent, or Firm*—Baker Botts L.L.P.

(57) ABSTRACT

In one aspect of the invention, a method for power loss notification includes receiving at least a threshold voltage from a power supply. The method also includes charging at least one capacitor when the power supply is supplying at least the threshold voltage. The method further includes failing to receive at least the threshold voltage from the power supply, and reverse biasing at least one diode coupled between the power supply and the at least one capacitor. In addition, the method includes detecting the reverse bias state of the diode.

19 Claims, 2 Drawing Sheets

COMMUNICATION SYSTEM POWER LOSS NOTIFICATION VIA DETECTION OF REVERSE BIAS STATE OF A DIODE BASED ON A THRESHOLD VOLTAGE

TECHNICAL FIELD OF THE INVENTION

This invention relates generally to power delivery systems, and more particularly to a system and method for power loss notification.

BACKGROUND OF THE INVENTION

Computers often communicate over a network using a modem at a subscriber's location. This modem facilitates the communication of data from the subscriber to a remote location, such as to a central office of a service provider. The modem typically receives power from an external power supply. When the modem loses power, the modem generally informs the central office or other remote location of the power loss. This allows the central office to stop transmitting data to the modem when the modem is unable to receive that data.

Modems often use one or more capacitors to store a voltage charge from the power supply. To determine when a power loss occurs, modems typically use power loss circuitry coupled to the capacitors. The power loss circuitry operates to monitor the voltage between the capacitors and the power supply. When the modem loses power, the power loss circuitry generally detects only the voltage stored in the capacitors. As the capacitors discharge, the charge stored in the capacitors falls below a threshold value, often called a "trip point." The power loss circuitry then generates an output signal indicating that a power loss has occurred. Because the power loss circuitry monitors the level of the voltage charge stored in the capacitors, the circuitry is often referred to as a "level detector."

A problem with this approach is that a relatively long period of time may elapse between the time the modem loses power and the time the power loss circuitry detects the power loss. The power loss circuitry typically must wait for the capacitors to discharge enough voltage before sensing the power loss. This increases the time between the power loss and the detection of the power loss, and this period of time is often important. For example, the power loss circuitry needs to detect the power loss while enough internal power remains in the modem to transmit a power loss signal to the central office. If too much time elapses before the circuitry detects the power loss, the modem will not have enough power to generate and transmit the power loss signal.

Another problem with this approach is that it typically increases the amount of circuitry used in the modem. For example, this approach often requires the addition of several components, such as additional capacitors coupled to the power supply. These additional components increase the overall cost of the modem and take up space that could be used for other elements in the modem.

SUMMARY OF THE INVENTION

The present invention recognizes a need for an improved system and method for power loss notification, which reduce or eliminate some or all of the problems and disadvantages associated with prior systems and methods.

In one embodiment of the invention, a modem includes communication circuitry operable to facilitate communication over a communication link. The modem also includes at least one capacitor operable to store a voltage when a power supply is supplying at least a threshold voltage to the modem. The modem further includes at least one diode coupled between the power supply and the at least one capacitor. The diode is operable to operate in a forward bias state while the power supply is supplying at least the threshold voltage. In addition, the modem includes a power loss sensor coupled in parallel with the diode and in series with the communication circuitry. The power loss sensor is operable to detect a reverse bias state of the diode and to signal the communication circuitry to communicate a power loss signal over the communication link.

In a particular embodiment of the invention, the power loss sensor comprises a digital detector. The digital detector is operable to detect the presence or absence of a voltage between the diode and the power supply.

In another embodiment of the invention, a method for power loss notification includes receiving at least a threshold voltage from a power supply. The method also includes charging at least one capacitor when the power supply is supplying at least the threshold voltage. The method further includes failing to receive at least the threshold voltage from the power supply, and reverse biasing at least one diode coupled between the power supply and the at least one capacitor. In addition, the method includes detecting the reverse bias state of the diode.

Numerous technical advantages can be gained through various embodiments of the invention. Various embodiments of the invention may exhibit none, some, or all of the following advantages. For example, in one embodiment of the invention, a modem is provided that quickly identifies when a power loss occurs. The modem may then generate a power loss signal informing a central office or other network element of the power loss. By quickly identifying when the power loss occurs, a shorter period of time may elapse between the time the modem loses power and the time the modem detects the power loss. This helps to reduce or eliminate the likelihood that the modem will be unable to generate and transmit the power loss signal to the central office or other network element.

Some embodiments of the invention also simplify the circuitry used in the modem. For example, in one embodiment, fewer capacitors may be coupled to the power supply and used in the modem. This helps to reduce the size and cost of the modem. Also, the modem is not limited to the use of a "level detector." The modem may, for example, use any digital detector operable to detect the presence or absence of a voltage signal. Although a level detector may still be used to detect a power loss, other less expensive circuits can also be used.

Other technical advantages will be readily apparent to one of skill in the art from the attached figures, description, and claims.

BRIEF DESCRIPTION OF THE DRAWINGS

For a more complete understanding of the present invention and the advantages thereof, reference is now made to the following descriptions taken in connection with the accompanying drawings, in which.

DETAILED DESCRIPTION OF THE INVENTION

Figure 1:
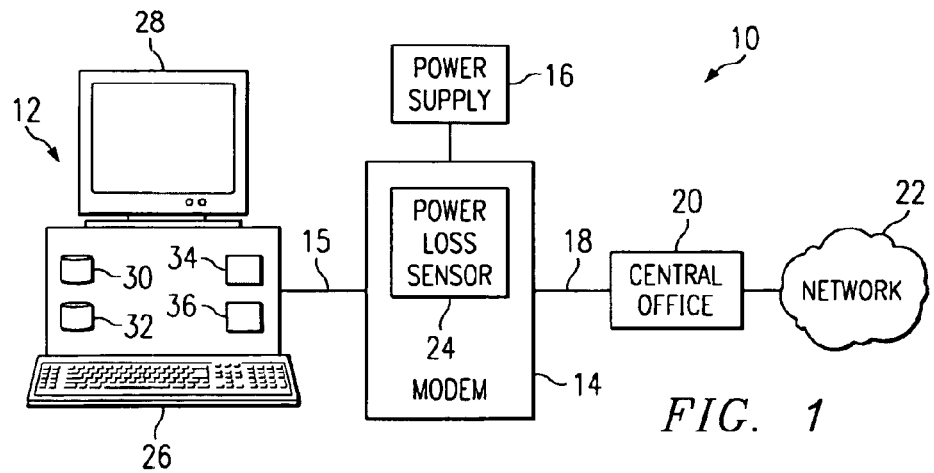
FIG. 1 is a block diagram illustrating an exemplary communication system constructed according to the teachings of the present invention.

FIG. 1 is a block diagram illustrating an exemplary communication system 10 constructed according to the teachings of the present invention. In the illustrated embodiment, system 10 includes one or more host computers 12 and a modem 14 coupled to a power supply 16. A communication link 18 facilitates communication between the modem 14 and other network elements, such as a central office 20 coupled to a network 22. Other embodiments of system 10 may be used without departing from the scope of the present invention.

In general, modem 14 facilitates communication between host 12 and network 22. Modem 14 may, for example, communicate information to and receive information from network 22 through central office 20. Modem 14 also receives power from power supply 16, and modem 14 includes a power loss sensor 24. Power loss sensor 24 detects when modem 14 loses power, or stops receiving at least a threshold voltage, from power supply 16. When power loss sensor 24 detects a power loss, modem 14 communicates a power loss signal to central office 20. In one embodiment, power loss sensor 24 may include a digital detector operable to detect the presence or absence of power from power supply 16.

This invention is described as it relates to the detection of a power loss in modem 14. The invention may also be used to detect a power loss in any other apparatus that receives power from a power supply and attempts to perform an action in response to a power loss. For example, the invention may be used in a laptop computer or a personal digital assistant to signal when a battery power supply is losing power. The invention could also be used in a server computer to signal when the server loses power. In response, the software in the laptop computer, server computer, or personal digital assistant may store information in a nonvolatile memory and shut down other programs in an orderly fashion. The invention could further be used in a wireless device, such as a mobile telephone or a BLUETOOTH device, to detect a power loss and communicate a "sign-off" signal over a wireless interface.

Host 12 is coupled to modem 14. In this document, the term "couple" refers to any direct or indirect communication between two or more elements, whether or not those elements are in physical contact with one another. Host 12 may execute with any of the well-known MS-DOS, PC-DOS, OS-2, MAC-OS, WINDOWS, UNIX, or other appropriate operating systems. Host 12 may comprise, for example, a desktop computer, a laptop computer, a personal digital assistant, or any other computing or communicating device. In the illustrated embodiment, host 12 includes an input device 26, an output device 28, random access memory (RAM) 30, read-only memory (ROM) 32, CD-ROM, hard drive, or other magnetic or optical storage media 34 or other appropriate volatile or nonvolatile storage and retrieval devices, and a processor 36 having a system clock or other suitable timing device or software. Input device 26 may comprise, for example, a keyboard, mouse, graphics tablet, touch screen, pressure-sensitive pad, joystick, light pen, microphone, or other suitable input device. Output device 28 may comprise, for example, a video display, a printer, a disk drive, a plotter, a speaker, or other suitable output device.

Modem 14 is coupled to host 12 and to communication link 18. Modem 14 provides an interface between host 12 and communication link 18. Throughout this document, the term "modem" refers to any combination of hardware, software, and/or firmware operable to facilitate an interface between a communication link and a host device. For example, modem 14 may transport information between host 12 and central office 20. The features and elements of modem 14 may reside externally to host 12, or may be partially or completely integrated into host 12. For example, modem 14 could reside integrally within host 12, may comprise a device card coupled to a bus within host 12, or may comprise a device external to host 12 communicating with host 12 over a communication link 15. In that case, communication link 15 could comprise, for example, a local area network (LAN) such as an Ethernet connection. In addition to providing basic interfacing functions, modem 14 could, in some embodiments, provide routing, bridging, and/or switching functions.

Figure 2:
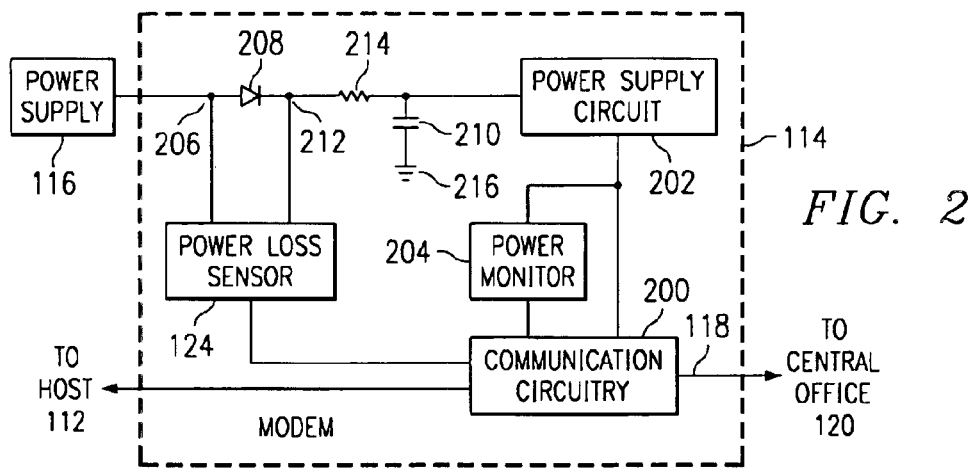
FIG. 2 is a block diagram illustrating an exemplary modem constructed according to the teachings of the present invention.

In one embodiment, modem 14 comprises a digital subscriber line (DSL) modem. In this embodiment, modem 14 may implement any of the DSL protocols, including full-rate Asymmetric DSL (ADSL), ADSL Lite, and Very-high-rate DSL (VDSL). Modem 14 may also comprise a cable modem or other suitable communication device. In addition, the invention contemplates other later revisions, modifications, enhancements, or new types of communications techniques. One embodiment of a modem is shown in FIG. 2, which is described below.

Power supply 16 is coupled to modem 14 and supplies power to modem 14. Power supply 16 may comprise any suitable source of power for modem 14. In one embodiment, power supply 16 comprises a direct current power supply. Power supply 16 may reside externally to modem 14 and/or host 12, or may be partially or completely integrated into modem 14 and/or host 12. For example, power supply 16 could reside within host 12, central office 20, modem 14, or any other suitable location.

Communication link 18 couples modem 14 to central office 20. Communication link 18 facilitates communication between modem 14 and central office 20. Communication link 18 may comprise any communications medium operable to facilitate communication of analog and/or digital signals using ground-based and/or space-based components. Communication link 18 may, for example, comprise a twisted-pair copper telephone line, a fiber optic line, or a wireless link between modem 14 and central office 20.

In the illustrated embodiment, central office 20 is coupled to communication link 18 and to network 22. Central office 20 facilitates communication between modem 14 and network 22. Network 22 may include any suitable wireline or wireless system that supports communication between network elements using ground-based and/or space-based components. For example, network 22 may be a public switched telephone network (PSTN), an integrated services digital network (ISDN), a local area network (LAN), a wide area network (WAN), a global computer network such as the Internet, or any other communication system or systems at one or more locations.

Figure 3:
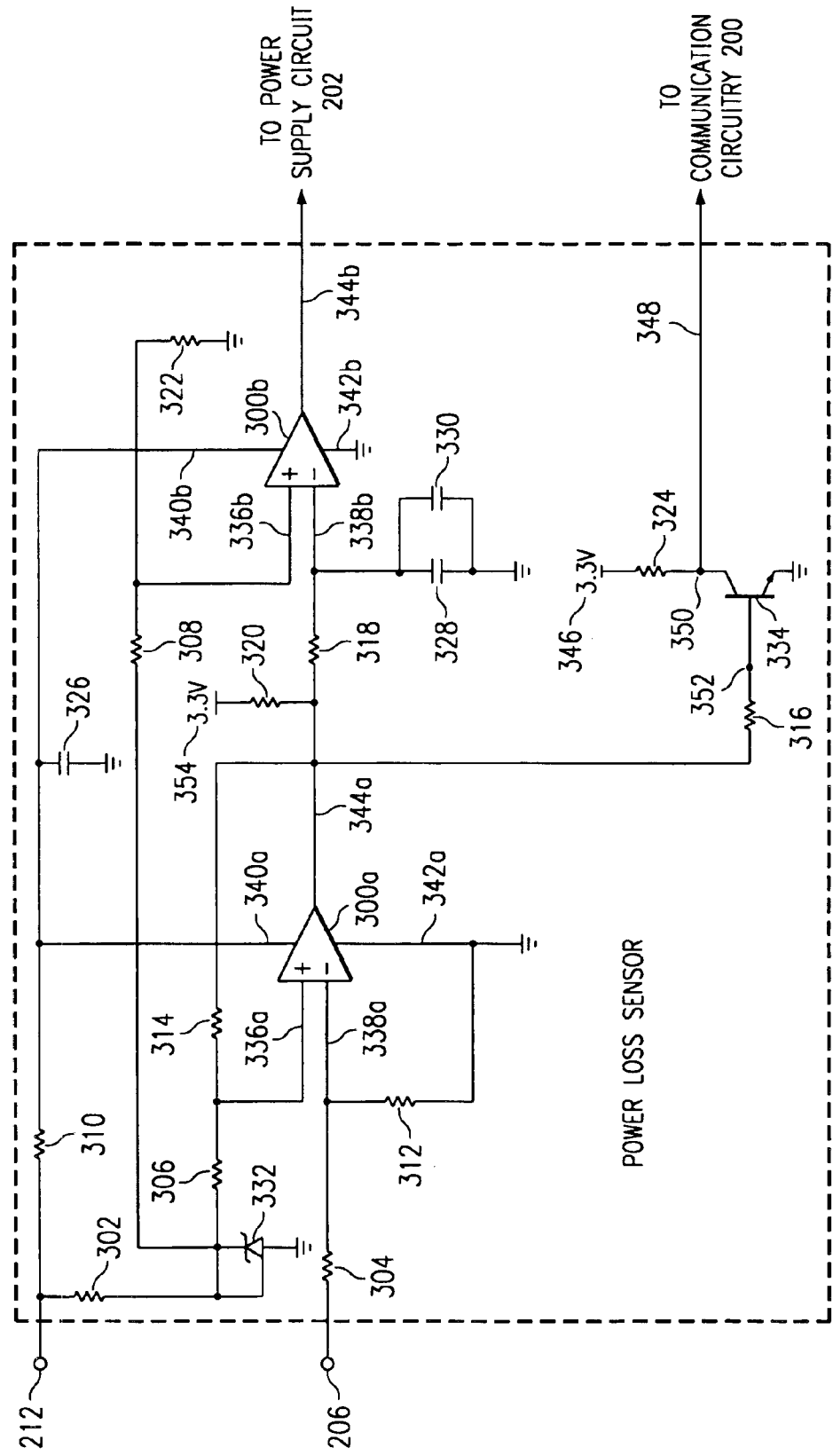
FIG. 3 is a block diagram illustrating an exemplary power loss sensor constructed according to the teachings of the present invention.

In the illustrated embodiment, modem 14 includes a power loss sensor 24. Power loss sensor 24 is operable to detect when modem 14 stops receiving at least a threshold voltage from power supply 16. When power loss sensor 24 detects a power loss, power loss sensor 24 causes modem 14 to communicate a power loss signal to central office 20. This informs central office 20 that modem 14 cannot receive information from network 22 because of the power loss. In one embodiment, power loss sensor 24 comprises a digital detector. In this document, the phrase "digital detector" refers to any hardware, software, firmware, or combination thereof operable to detect the presence or absence of a voltage signal from power supply 16. Power loss sensor 24 may, for example, comprise a comparator, a digital gate such as an AND gate, or a buffer gate. One embodiment of a power loss sensor is shown in FIG. 3, which is described below.

FIG. 2 is a block diagram illustrating an exemplary modem 114 constructed according to the teachings of the present invention. Modem 114 may be useful, for example, in system 10 of FIG. 1. In the illustrated embodiment, modem 114 includes communication circuitry 200, a power supply circuit 202, a power monitor 204, and a power loss sensor 124.

Communication circuitry 200 facilitates communication between one or more hosts 112 and a central office 120 over a communication link 118. Communication circuitry 200 may, for example, receive digital information from host 112 and convert it into analog signals for communication toward a network. Communication circuitry 200 may also receive analog information over communication link 118 and convert it into digital signals for communication to host 112. Communication circuitry 200 may comprise any hardware, software, firmware, or combination thereof operable to facilitate communication over communication link 118. Communication circuitry 118 may, for example, include an analog-to-digital converter, a digital-to-analog converter, and a digital signal processor.

Power supply circuit 202 is coupled to communication circuitry 200 and to a power supply 116. Power supply circuit 202 receives power from power supply 116, generates a voltage signal using the power from power supply 116, and communicates the voltage signal to communication circuitry 200. Power supply circuit 202 may comprise any hardware, software, firmware, or combination thereof operable to receive power and provide a voltage signal to communication circuitry 200. In one embodiment, power supply circuit 202 includes a three amp flyback regulator, such as a LM2585T-ADJ switcher, and a transformer.

Power monitor 204 is coupled to power supply circuit 202 and communication circuitry 200. Power monitor 204 monitors the voltage signal supplied to communication circuitry 200 by power supply circuit 202. When the voltage of the signal supplied to communication circuitry 200 falls outside a threshold range, power monitor 204 generates a reset signal. The reset signal prevents communication circuitry 200 from operating. When the signal supplied to communication circuitry 200 is within the threshold voltage range, power monitor 204 allows communication circuitry 200 to operate. In this manner, power monitor 204 prevents damage to communication circuitry 200 by, for example, an excessive amount of voltage supplied to communication circuitry 200. Power monitor 204 may comprise any hardware, software, firmware, or combination thereof operable to regulate the power supplied to communication circuitry 200. In one embodiment, power monitor 204 comprises a LP2989IM-2.5 Micropower/Low Noise 500 milliamp Ultra-Low Dropout Regulator.

Power loss sensor 124 is coupled to power supply 116, power supply circuit 202, and communication circuitry 200. Power loss sensor 124 monitors the voltage level of the power supplied to modem 114 at a terminal 206. When power supply 116 is supplying power to modem 114, power loss sensor 124 detects a voltage at terminal 206 and allows communication circuitry 200 to continue operating. When modem 114 stops receiving at least a threshold voltage from power supply 116, power loss sensor 124 detects the lack of the threshold voltage at terminal 206 and causes communication circuitry 200 to communicate a power loss signal to central office 120 over communication link 118. Power loss sensor 124 may comprise any hardware, software, firmware or combination thereof operable to detect a power loss at terminal 206. One embodiment of a power loss sensor is shown in FIG. 3, which is described below.

To help increase the speed at which power loss sensor 124 detects a loss of power at terminal 206, modem 114 also includes one or more diodes 208 and one or more capacitors 210. Diode 208 is coupled in series between power supply 116 and power supply circuit 202. Diode 208 allows current to flow from terminal 206 to a terminal 212, and diode 208 limits the current flowing from terminal 212 to terminal 206. For example, when the voltage at terminal 206 is above a threshold voltage, such as 0.7 volts, diode 208 operates in a forward bias state, and current may flow through diode 208. When the voltage at terminal 206 drops below the threshold voltage, diode 208 operates in a reverse bias state, and current may not flow through diode 208. In one embodiment, diode 208 is selected to have a current rating high enough to withstand the ordinary current flowing through diode 208 when power supply 116 is supplying power to modem 114. Also, diode 208 may be selected to withstand surge currents experienced in modem 114, such as when modem 114 is coupled to power supply 116. In a particular embodiment, modem 114 also includes a resistor 214 coupled in series with diode 208. Resistor 214 helps to limit the surge current experienced by diode 208 in modem 114. In addition, diode 208 may be selected to withstand the back bias voltage when modem 114 loses power from power supply 116. When modem 114 loses a sufficient amount of power, a higher voltage may exist at terminal 212 than at terminal 206, and a back bias voltage exists across diode 208. Selecting a diode 208 having suitable current and back bias voltage ratings may help to ensure proper operation of modem 114. Diode 208 may comprise any suitable diode or diodes, such as a silicon diode or a Schottky diode. In one embodiment, multiple diodes 208 may be used in modem 114. Any combination of diodes 208 may be selected to vary the threshold voltage at which diodes 208 reverse bias and power loss sensor 124 detects the power loss.

One or more capacitors 210 are coupled between diode 208 and, for example, a ground 216. Capacitors 210 receive and store a voltage charge when power supply 116 supplies sufficient power to modem 114 to forward bias diode 208. Capacitors 210 may comprise any suitable capacitor or capacitors operable to store sufficient voltage to allow communication circuitry 200 to continue operating until a power loss notification signal can be communicated to central office 120. For example, capacitors 210 may comprise two 1,000 microfarad capacitors and one forty-seven microfarad capacitor coupled in parallel.

In one aspect of operation, when power supply 116 supplies power to modem 114, at least a threshold voltage appears at terminal 206, and power loss sensor 124 does not detect a power loss in modem 114. Also, when power supply 116 provides power to modem 114, diode 208 is forward biased, and capacitors 210 store a voltage charge. When power supply 116 stops supplying at least a threshold voltage to modem 114, the voltage stored in capacitors 210 appears as a voltage at terminal 212. The lack of a voltage at terminal 206, coupled with the voltage at terminal 212, reverse biases diode 208. This produces a zero or near-zero voltage at terminal 206. Power loss sensor 124 detects the reverse bias state of diode 208 and signals communication circuitry 200 to communicate a power loss signal to central office 120.

The use of diode 208 and capacitor 210 in modem 114 helps to increase the speed at which a zero or near-zero voltage signal appears at terminal 206. This also increases the speed at which power loss sensor 124 detects a power loss in modem 114. By detecting the loss of power in modem 114 in less time, communication circuitry 200 has more time to communicate the power loss signal to central office 120. This helps to decrease the likelihood that communication circuitry 200 will lose power before generating and communicating the power loss signal to central office 120.

FIG. 3 is a block diagram illustrating an exemplary power loss sensor 224 constructed according to the teachings of the present invention. Power loss sensor 224 may be useful, for example, in modem 114 of FIG. 2. In the illustrated embodiment, power loss sensor 224 includes two comparators 300a and 300b, resistors 302–324, capacitors 326–330, a zener diode 332, and a transistor 334. Other embodiments of power loss sensor 224 may be used without departing from the scope of the present invention.

Each comparator 300 is operable to receive a first input 336 and a second input 338. Each comparator 300 is also operable to receive power through a terminal 340, and each comparator 300 is coupled to a ground through a terminal 342. Comparator 300 is operable to compare the input signals 336 and 338 and generate an output signal 344 based on the comparison. Comparator 300 may comprise any hardware, software, firmware or combination thereof operable to receive and compare input signals. In one embodiment, comparators 300 comprise a LM2903 Low Power, Low Offset Voltage, Dual Comparator.

In the illustrated embodiment, resistor 320 is coupled to a voltage source 354. In one embodiment, voltage source 354 comprises a 3.3 volt direct current voltage signal. Component values for resistors 302–324 and capacitors 326–330 may be selected to provide any desired functionality of power loss sensor 224. In a particular embodiment, resistors 302 and 304 each comprise a 4.99 kilo-ohm resistor; resistors 306 and 308 each comprise a one kilo-ohm resistor; resistor 310 comprises a ten ohm resistor; resistor 312 comprises a two kilo-ohm resistor; resistors 314, 316, and 318 each comprise a 25.5 kilo-ohm resistor; resistors 320 and 322 each comprise a 7.5 kilo-ohm resistor; resistor 324 comprises a ten kilo-ohm resistor; capacitor 326 comprises a one microfarad capacitor; and capacitors 328 and 330 each comprise a 2.2 microfarad capacitor. Other component values may be selected without departing from the scope of the present invention.

Zener diode 332 may comprise any suitable diode. In one embodiment, zener diode 332 comprises a TL431CPK adjustable precision shunt regulator. Transistor 334 may comprise any suitable transistor. In one embodiment, transistor 334 comprises a NPN transistor. In a particular embodiment, transistor 334 comprises a MMBT2222 NPN transistor. In the illustrated embodiment, transistor 334 includes a collector 350 coupled to a voltage source 346 and a base 352 coupled to comparator 300a. In one embodiment, voltage source 346 comprises a 3.3 volt direct current voltage signal.

In one aspect of operation, when modem 114 is receiving at least a threshold voltage from power supply 116, the voltage at terminal 206 exceeds the voltage at terminal 212. This may, for example, be due to the voltage drop across diode 208. Comparator 300a receives at least a portion of the voltage at terminal 212 as input signal 336a and at least a portion of the voltage at terminal 206 as input signal 338a. Comparator 300a compares the signals 336a and 338a and, because the voltage at terminal 206 exceeds the voltage at terminal 212, outputs a low voltage signal 344a. The low voltage signal is communicated to base 352 of transistor 334, which signals communication circuitry 200 to operate normally.

When modem 114 stops receiving at least a threshold voltage from power supply 116, diode 208 begins operating in a reverse bias state. The voltage at terminal 212 exceeds the voltage at terminal 206 because, for example, capacitors 210 may contain a voltage charge. Comparator 300a receives at least a portion of the voltage at terminal 212 as input signal 336a and at least a portion of the voltage at terminal 206 as input signal 338a. Comparator 300a compares the signals 336a and 338a and, because the voltage at terminal 212 exceeds the voltage at terminal 206, outputs a high voltage signal 344a. The high voltage signal 344a is communicated to base 352 of transistor 334, which signals communication circuitry 200 to communicate a power loss signal.

In the illustrated embodiment, the output signal 344b of comparator 300b is communicated to power supply circuit 202. Power supply circuit 202 may use output signal 344b in providing power to communication circuitry 200. For example, in one embodiment, power supply circuit 202 includes a three amp flyback regulator, such as a LM2585T-ADJ switcher, and output signal 344b is used as a compensation pin voltage in the flyback regulator.

Although FIG. 3 illustrates one embodiment of power loss sensor 224, numerous changes may be made without departing from the scope of the present invention. For example, the arrangement and values of components in power loss sensor 224 is for illustration only. Other arrangements and/or component values may be used without departing from the scope of the present invention.

Figure 4:
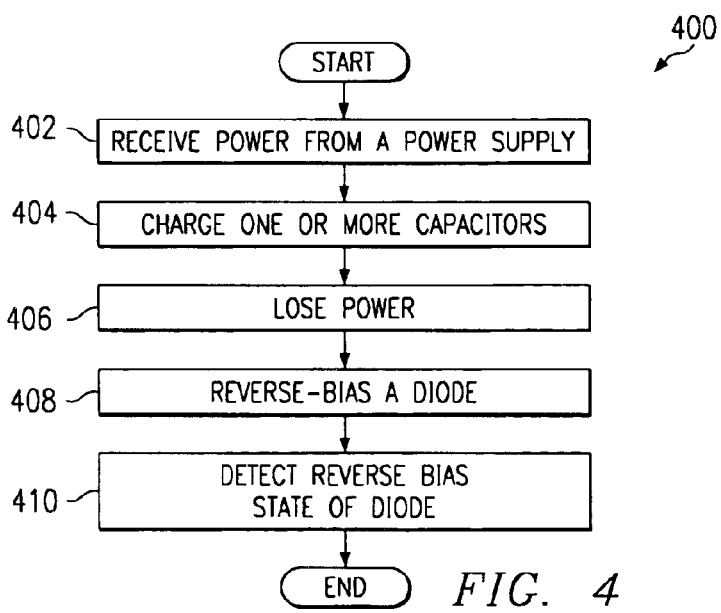
FIG. 4 is a flow diagram illustrating an exemplary method for power loss notification according to the teachings of the present invention.

FIG. 4 is a flow diagram illustrating an exemplary method 400 for power loss notification according to the teachings of the present invention. Although method 400 is described below as it relates to modem 114, the same or similar method may be used by modem 14 of system 10.

Modem 114 receives power at step 402. This may include, for example, modem 114 receiving power from power supply 116. Modem 114 charges one or more capacitors 210 at step 404. This may include, for example, capacitors 210 charging when modem 114 is receiving power from power supply 116.

Modem 114 loses power at step 406. This may include, for example, modem 114 failing to receive at least a threshold voltage from power supply 116. Modem 114 reverse biases diode 208 at step 408. The lack of at least a threshold voltage at terminal 206 caused by the loss of power, coupled with the voltage at terminal 212 from the stored voltage in capacitors 210, reverse biases diode 208. Modem 114 detects the reverse bias state of diode 208 at step 410. This may include, for example, power loss sensor 124 detecting the absence of a voltage between power supply 116 and diode 208. After detecting the absence of a voltage, power loss sensor 124 may take any suitable corrective action, such as instructing communication circuitry 200 to communicate a power loss signal to central office 120.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A modem, comprising:
   communication circuitry operable to facilitate communication over a communication link;
   at least one capacitor operable to store a voltage when a power supply is supplying at least a threshold voltage to the modem;
   at least one diode coupled between the power supply and the at least one capacitor, the diode operable to operate in a forward bias state while the power supply is supplying at least the threshold voltage;
   a power loss sensor coupled in parallel with the diode and in series with the communication circuitry, the power loss sensor operable to detect a reverse bias state of the diode and to signal the communication circuitry to communicate a power loss signal over the communication link, the reverse bias state of the diode indicating that the power supply has failed to supply the at least the threshold voltage to the modem;
   a power supply circuit coupled in series with the at least one diode, the power supply circuit operable to receive at least a portion of the threshold voltage from the power supply and to supply a voltage signal to the communication circuitry; and
   a power monitor coupled in series with the power supply circuit and in series with the communication circuitry, the power monitor operable to generate a reset signal when the voltage signal supplied by the power supply circuit to the communication circuitry falls outside an acceptable voltage range.

2. The modem of claim 1, wherein the power loss sensor comprises a digital detector operable to detect the presence or absence of a voltage between the diode and the power supply.

3. The modem of claim 1, wherein the power loss sensor comprises:
   a comparator having a first input coupled between the power supply and the diode and a second input coupled between the diode and the at least one capacitor; and
   a transistor coupled to an output of the comparator.

4. The modem of claim 1, wherein the power supply comprises a direct current power supply.

5. The modem of claim 1, further comprising a resistor coupled in series with the diode.

6. A system for power loss notification, comprising an apparatus operable to receive power from a power supply, the apparatus comprising:
   at least one capacitor operable to store a voltage when the power supply is supplying at least a threshold voltage to the apparatus;
   at least one diode coupled between the power supply and the at least one capacitor, the diode operable to operate in a forward bias state while the power supply is supplying at least the threshold voltage; and
   a power loss sensor coupled in parallel with the diode, the power loss sensor operable to detect a reverse bias state of the diode and to signal the apparatus to communicate a power loss signal to an external device, the reverse bias state of the diode indicating that the power supply has failed to supply the at least the threshold voltage to the apparatus,
   a power supply circuit coupled in series with the at least one diode, the power supply circuit operable to receive at least a portion of the threshold voltage from the power supply and to supply a voltage signal to the apparatus; and
   a power monitor coupled in series to the power supply circuit and operable to generate a reset signal when the voltage signal supplied by the power supply circuit falls outside an acceptable voltage range.

7. The system of claim 6, wherein the power loss sensor comprises a digital detector operable to detect the presence or absence of a voltage between the diode and the power supply.

8. The system of claim 6, wherein the power loss sensor comprises:
   a comparator having a first input coupled between the power supply and the diode and a second input coupled between the diode and the at least one capacitor; and
   a transistor coupled to an output of the comparator.

9. The system of claim 6, wherein the power supply comprises a direct current power supply.

10. The system of claim 6, further comprising a resistor coupled in series with the diode.

11. The system of claim 6, wherein the power supply is integral with the apparatus.

12. The system of claim 6, wherein the power loss sensor is operable to detect a reverse bias state of the diode and to signal communication circuitry to communicate a power loss signal over a communication link.

13. A method for power loss notification, comprising:
   receiving at least a portion of a threshold voltage from a power supply at a power supply circuit, the power supply circuit operable to generate a voltage signal;
   charging at least one capacitor when the power supply is supplying at least the threshold voltage;
   failing to receive at least the threshold voltage from the power supply;
   after failing to receive at least the threshold voltage, reverse biasing at least one diode coupled between the power supply and the at least one capacitor;
   detecting the reverse bias state of the at least one diode using a power loss sensor coupled in parallel to the at least one diode and in series with communication circuitry; and
   generating a reset signal when the voltage signal generated by the power supply circuit falls outside an acceptable voltage range.

14. The method of claim 13, wherein a digital detector detects the reverse bias state of the diode by detecting the presence or absence of a voltage between the diode and the power supply.

15. The method of claim 13, wherein a power loss sensor detects the reverse bias state of the diode, the power loss sensor comprising:
   a comparator having a first input coupled between the power supply and the diode and a second input coupled between the diode and the at least one capacitor; and
   a transistor coupled to an output of the comparator.

16. The method of claim 13, wherein the power supply comprises a direct current power supply.

17. The method of claim 13, further comprising communicating a power loss signal over a communication link in response to detecting the reverse bias state of the diode.

18. A modem, comprising:

communication circuitry operable to facilitate communication over a communication link;

at least one capacitor operable to store a voltage when a power supply is supplying at least a threshold voltage to the modem;

at least one diode coupled between the power supply and the at least one capacitor, the diode operable to operate in a forward bias state while the power supply is supplying at least the threshold voltage;

a power supply circuit coupled in series with the diode, the power supply circuit operable to receive at least a portion of the threshold voltage from the power supply and to supply a voltage signal to the communication circuitry;

a power monitor coupled in series with the power supply circuit and in series with the communication circuitry, the power monitor operable to generate a reset signal when the voltage signal supplied by the power supply circuit to the communication circuitry falls outside an acceptable voltage range; and a power loss sensor coupled in parallel with the diode and in series with the communication circuitry, the power loss sensor operable to detect a reverse bias state of the diode and to signal the communication circuitry to communicate a power loss signal over the communication link, the reverse bias state of the diode indicating that the power supply has failed to supply the at least the threshold voltage to the modem, the power loss sensor comprising:

a comparator having a first input coupled between the power supply and the diode and a second input coupled between the diode and the at least one capacitor; and a transistor coupled to an output of the comparator.

19. A method for power loss notification, comprising:

receiving at least a portion of a threshold voltage from a power supply at a power supply circuit associated with a modem, the power supply circuit operable to generate a voltage signal;

charging at least one capacitor when the modem is receiving at least the threshold voltage from the power supply;

supplying the voltage signal to communication circuitry in the modem using at least a portion of the threshold voltage from the power supply;

failing to receive at least the threshold voltage from the power supply;

after failing to receive at least the threshold voltage, reverse biasing at least one diode coupled between the power supply and the at least one capacitor;

detecting the reverse bias state of the at least one diode using a power loss sensor coupled in parallel to the at least one diode and in series with the communication circuitry, the power loss sensor comprising:

a comparator having a first input coupled between the power supply and the diode and a second input coupled between the diode and the at least one capacitor; and a transistor coupled to an output of the comparator; and generating a reset signal when the voltage signal generated by the power supply circuit falls outside an acceptable voltage range.

* * * * *